US 7,952,732 B2

(12) United States Patent
Shimazawa

(10) Patent No.: US 7,952,732 B2
(45) Date of Patent: May 31, 2011

(54) IMAGE PROCESSING APPARATUS

(75) Inventor: Yohichi Shimazawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1047 days.

(21) Appl. No.: 11/452,453

(22) Filed: Jun. 13, 2006

(65) Prior Publication Data

US 2007/0008569 A1    Jan. 11, 2007

(30) Foreign Application Priority Data

Jun. 30, 2005    (JP) .................................. 2005-191787

(51) Int. Cl.
*G06K 15/00* (2006.01)
*G06K 1/00* (2006.01)
*G06F 3/12* (2006.01)
*G06F 15/00* (2006.01)

(52) U.S. Cl. ...................... 358/1.14; 358/1.13; 358/1.15; 358/1.16; 358/1.17; 358/1.18; 358/1.9

(58) Field of Classification Search ............... 358/1.9, 358/1.12–1.18, 3.28; 399/271, 366; 382/100
See application file for complete search history.

(56) References Cited

U.S. PATENT DOCUMENTS

| | | | | |
|---|---|---|---|---|
| 5,444,518 | A * | 8/1995 | Hashiguchi et al. | 399/271 |
| 5,798,844 | A | 8/1998 | Sakano et al. | |
| 6,062,750 | A * | 5/2000 | Ueno et al. | 400/615.2 |
| 6,295,136 | B1 * | 9/2001 | Ono et al. | 358/1.15 |
| 6,477,318 | B2 * | 11/2002 | Ishii | 386/246 |
| 6,665,096 | B1 * | 12/2003 | Oh | 358/461 |
| 6,901,236 | B2 * | 5/2005 | Saitoh et al. | 399/366 |
| 7,131,775 | B2 * | 11/2006 | Uchida et al. | 400/62 |
| 7,227,661 | B2 * | 6/2007 | Matsunoshita | 358/1.15 |
| 7,396,097 | B2 * | 7/2008 | Yamazaki et al. | 347/15 |
| 7,472,165 | B2 * | 12/2008 | Sawada | 709/207 |
| 7,474,439 | B2 * | 1/2009 | Uchida et al. | 358/1.9 |
| 7,548,340 | B2 * | 6/2009 | Ishikawa et al. | 358/1.9 |
| 7,567,355 | B2 * | 7/2009 | Matsunoshita | 358/1.13 |
| 7,580,159 | B2 * | 8/2009 | Guan et al. | 358/3.28 |
| 2003/0214669 | A1 * | 11/2003 | Saitoh | 358/1.15 |
| 2004/0012812 | A1 * | 1/2004 | Shimizu | 358/1.15 |
| 2004/0179713 | A1 * | 9/2004 | Tani et al. | 382/100 |
| 2004/0258277 | A1 | 12/2004 | Ueda | |

FOREIGN PATENT DOCUMENTS

| | | |
|---|---|---|
| JP | 07-036325 | 2/1995 |
| JP | 07-038737 | 2/1995 |
| JP | 2000-184178 | 6/2000 |
| JP | 2004-206636 | 7/2004 |
| JP | 2005-028673 | 2/2005 |

* cited by examiner

*Primary Examiner* — James A Thompson
*Assistant Examiner* — Satwant K Singh
(74) *Attorney, Agent, or Firm* — David G. Conlin; Steven M. Jensen; Edwards Angell Palmer & Dodge LLP

(57) ABSTRACT

A digital multi-function peripheral appends, according to the predetermined specific image information appending conditions, the image data which meets the appending conditions with the specific image information in a form which is set in accordance with the appending conditions when image data which is read at an image reading portion or image data which is externally entered via a FAX modem or communication portion is used for image formation at a printing portion. It is set so that the specific image information is appended to high secrecy image data. When trying to copy the printed image in which the specific image information is embedded, the copy machine which has detected the specific image information will not output the copied image or output a copy sheet having thereon characters such as "Copy Prohibited".

7 Claims, 7 Drawing Sheets

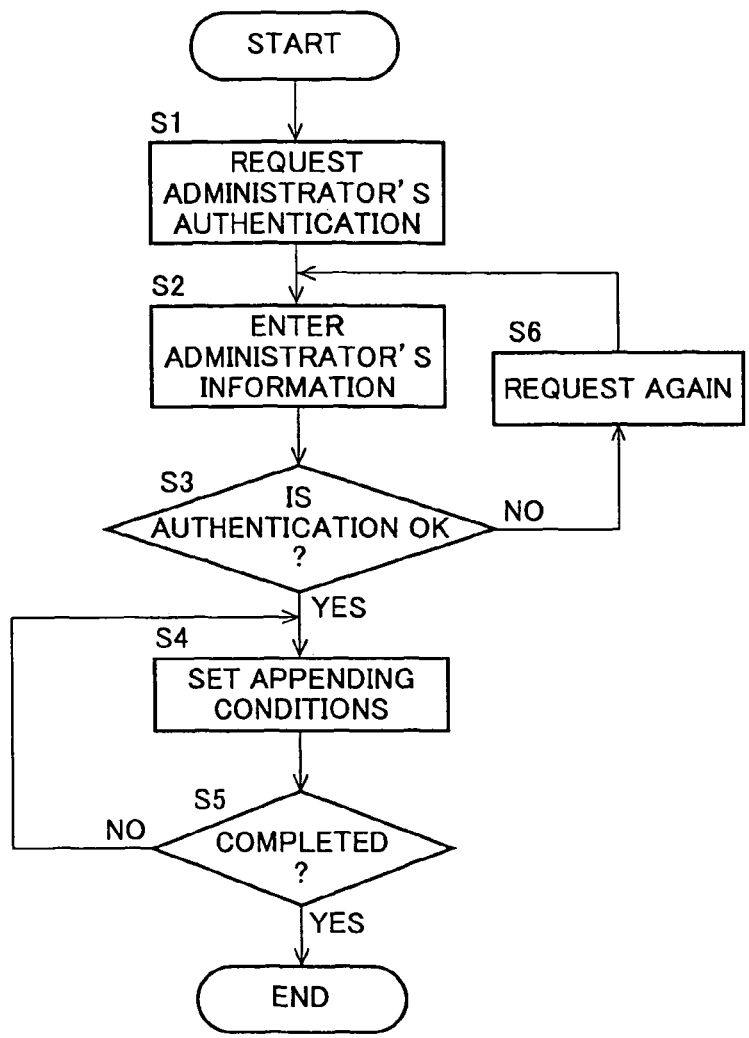

| LEVEL OF SPECIFIC IMAGE INFORMATION ||
|---|---|
| HIGH | LOW |
| 5<br>CENTER<br>DENSE | 1<br>EDGE<br>LIGHT |

IMAGE PROCESSING APPARATUS

CROSS-NOTING PARAGRAPH

This non-provisional application claims priority under 35 U.S.C. §119(a) on Patent Application No. 2005-191787 filed in JAPAN on Jun. 30, 2005, the entire contents of which are hereby incorporated herein by reference.

FIELD OF THE INVENTION

The present invention relates to an image processing apparatus and in particular to an image processing apparatus which is capable of appending image data with specific image information for prohibiting or discouraging copying thereof.

BACKGROUND OF THE INVENTION

In order to prevent unauthorized copying of original printed documents, techniques which append specific image information such as background pattern when the original document is printed have been used. This specific image information is often referred to as "copy discouraging information" or "anti-copy information".

For example, when image data is fed from an application running on a personal computer to a printer for printing out the image data from the printer, specific image information which discourages the copying of the image to be printed is fed to the printer together with the above image data, and embedded in somewhere of the image to be printed for printing out.

When trying to copy the printed image in which the specific image information is embedded, the copy machine which has detected the specific image information will not output the copied image or output a copy sheet having thereon characters such as "Copy Prohibited".

The above-mentioned specific image information may be embedded in printed image in the way that it can not be recognized by the user or it can be recognized by the user that it is the specific image information.

In either case, the copy machine detects the presence of the specific image information in the image information when the image information in which the specific image information is embedded is copied and conducts predetermined processing such as prohibition of the copying per se or outputting of a copied image having characters "Copy Prohibited" in response to a detection result.

In connection with the technique for prohibiting unauthorized copying, a copy machine which is capable of easily making an original document bearing specific pattern thereon is disclosed in, for example, Japanese Laid-Open Patent Publication No. H7-38737. The copy machine comprises generating means for generating (a) specific mark(s) for reproducing the image with appending the specific mark(s) to an original document image; mark detecting means for detecting the presence of the specific mark(s) in read original document image; and control means which conducts the copying operation which is different from usual copying operation if the specific mark is detected in the original document image is detected by said mark detecting means.

A copy machine which reproduces an image which makes it possible to detect the specific mark(s) in an easy and precise manner is disclosed in Japanese Laid-Open Patent Publication No. H7-36325. This copy machine has a capability of reproducing an image to which (a) specific mark(s) is/are appended by mark appending means. The mark appending means appends specific marks, each comprising a plurality of concentric circles having different diameters, to the original document image.

In the above-mentioned system which embeds the specific image information in the printed image for printing out, the specific image information is always embedded in the printed image irrespective of the importance degree or secrecy of the image to be printed and the embedded image is printed out. Such a system has a problem in that the specific image information can not be positively detected in a copy machine if the original printed document has graffiti or if foreign materials or dirt is adhered to the specific image information in the original document. There occurs another problem in that if a number of items of the specific image information are appended at random on the printed image so that the copy machine can positively detect the presence of the specific image information, the specific image information will make the printed image worse in appearance or cause discomfort to a viewer viewing the image.

In other words, when printing image data on a recording material, in order to prevent copying of obtained image data or discourage copying per se, it is effective to append specific image information like the above to image data. On the other hand, appending specific image information like the above to usual printed matter which does not require discouraging of copying may give an adverse influence upon the appearance of the copied image.

In view of this point, no technical concept of changing the conditions of appending copying discouraging information depending upon image data is disclosed in both Japanese Laid-Open Patent Publications Nos. H7-38737 and H7-36325.

SUMMARY OF THE INVENTION

It is an object of the present invention to provide a highly convenient image processing apparatus which appends specific image information used for prohibiting or discouraging unauthorized copying of image information depending upon the characteristics of the image data for which image processing is conducted, and where the conditions of appending specific image information can be optionally set.

It is another object of the present invention to provide an image processing apparatus for applying confidential processing to input image data, wherein said confidential processing is processing in which, when said image processing apparatus outputs image data and makes image forming apparatus to conduct image formation, said image processing apparatus once holds said image data output from said image processing apparatus to conduct image formation using said once held image data in accordance with confidential processing information representing confidential processing, which is provided by said image processing apparatus at the time of said confidential processing, and wherein said image processing apparatus comprises a specific image information appending portion for appending image data with specific image information representing a specific image when said image data is processed with said confidential processing.

It is a further object of the present invention to provide an image processing apparatus, wherein said image processing apparatus is an image forming apparatus forming an image on a recording material in accordance with input image data.

It is a further object of the present invention to provide an image processing apparatus, wherein, when said image formation is conducted using input image data, if it is confirmed that image data used for said image formation is an image to be confidentially processed by said confidential processing information, said image processing apparatus stores and holds said input image data in a given storing portion, and conducts image formation using image data stored and held in said storing portion when a given image formation output operation is performed.

It is a further object of the present invention to provide an image processing apparatus, wherein said image processing apparatus comprises a specific image appending condition setting portion for setting a condition for appending said specific image information that is to be appended at said specific image information appending portion; a storing portion for storing input image data; and an output instruction portion which accepts an instruction to output said image data stored in said storing portion, wherein, when an instruction to output image data stored in said storing portion is issued to said output instruction portion, if it is necessary to append specific image information to the image data instructed to be output in accordance with the appending condition of said specific image information which is set by said specific image appending condition setting portion, said image processing apparatus appends said image data with said specific image information for outputting it.

It is a further object of the present invention to provide an image processing apparatus, wherein said specific image information is visual to an eye of human being when image formation thereof is conducted.

It is a further object of the present invention to provide an image processing apparatus, wherein said image processing apparatus comprises an image reading portion for reading images output as a document, and when it determines that said specific image information is included in image information which is read by said image reading portion, said image processing apparatus invalidates said read image information.

BRIEF DESCRIPTION OF THE DRAWINGS

FIG. 5 is a flow chart for explaining an example of processing for setting conditions for appending the specific image information in an image processing apparatus;

FIG. 6 is a view for explaining an example of setting the specific image information appending conditions;

PREFERRED EMBODIMENTS OF THE INVENTION

Figure 1:
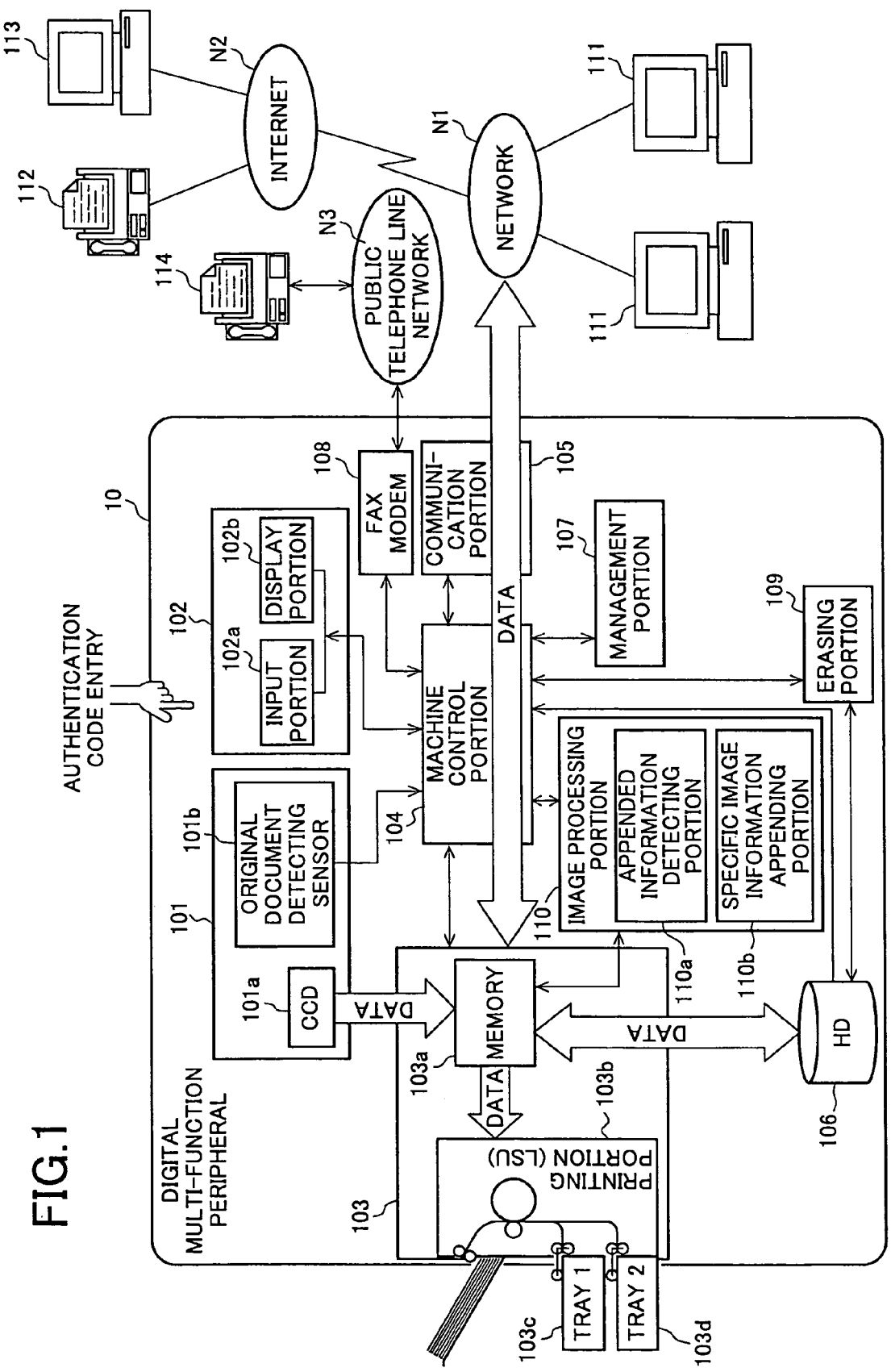
FIG. 1 is a block diagram for explaining an exemplary configuration of a digital multi-function peripheral to which an image processing apparatus of the present invention is applied.

FIG. 1 is a block diagram for explaining an exemplary configuration of a digital multi-functional peripheral to which the image processing apparatus of the present invention is applied. The digital multi-function peripheral in FIG. 1 is configured to include functions of a copy machine, printer, facsimile, and scanner.

The digital multi-function peripheral 10 comprises a machine control portion 104 including a CPU which performs arithmetic operations and a RAM and the like which store temporal information in association with the operations. A ROM which stores a control program for controlling the digital multifunctional peripheral 10 is included in the machine control portion 104.

A management portion 107 which is a memory storing management information (various items of control information) for managing the processing conducted by the digital multi-function peripheral 10 is connected to the machine control portion 104. An image reading portion 101 which reads images recorded on the recording paper to generate image data is connected to the machine control portion 104. The image reading portion 101 is provided with a CCD 101a for reading original document images as image data and an original document detecting sensor 101b which detects the presence or absence of the original document.

An image forming portion 103 which functions as an image forming portion to form image data on recording paper is connected to the machine control portion 104. The image forming portion 103 is provided with a memory 103a for temporarily storing the image data, a printing portion (LSU) 103b which forms images from the image data stored by the memory 103a for recording them on recording paper and sheet trays 103c, 103d from which recording paper is fed for the image formation at the printing portion 103b.

The digital multi-function peripheral 10 can form images at the printing portion 103b after the image data generated by the image reading portion 101 are stored on the memory 103a once. In such a manner, the digital multi-function peripheral 10 functions as a copy machine.

In FIG. 1, a FAX modem 108 for conducting facsimile communication is connected to the machine control portion 104. The FAX modem 108 is also connected to a public telephone line network N3. The digital multi-function peripheral 10 is capable of transmitting the image data which is generated by the image reading portion 101 to another facsimile 114 via the public telephone line network N3 which is connected to the FAX modem 104 by the facsimile communication. The digital multi-function peripheral 10 is also capable of receiving the image data transmitted from the other facsimile device 114 via the public telephone line network N3 at the FAX modem 108 to form images from the received image data at the image forming portion 103. In such a manner, the digital multi-function peripheral 10 also functions as a facsimile.

A communication portion (transceiver portion) 105 which enables the digital multi-function peripheral 10 to transmit/receive information to/from an external source is connected to the machine control portion 104. The communication portion 105 can be connected to a communication network N1 such as intra-LAN and the like. One or more personal computer(s) (PC(s)) 111 can be connected to the communication network N1. In a usual situation at which the digital multi-function peripheral 10 is operated alone, the communication portion 105 is connected to the communication network N1 for exchanging information with PC(s) 111 via the communication network N1.

The digital multi-function peripheral 10 is capable of transmitting image data which is generated by the image reading portion 101 to PC 111 from the communication portion 105. Thus, the digital multi-function peripheral 10 functions as a scanner. Further, the digital multi-function peripheral 10 is capable of receiving the image data transmitted from PC 111 at the communication portion 105 for forming images from the received image data at the image forming portion 103. Thus, the digital multi-function peripheral 10 serves as a printer.

The communication network N1 is connected to a wide area communication network N2 such as the Internet. The communication portion 105 is capable of receiving image data from the Internet facsimile 112 or an external PC 113 which are connected to the wide area communication network N2 via the communication network N1 and wide area communication network N2 through techniques such as transmitting image data with attaching them to an electronic mail. Thus, the digital multi-functional peripheral 10 also serves as an Internet facsimile device.

An operation portion 102 which accepts operations by the user is connected to the machine control portion 104. The operation portion 102 comprises an input portion 102a such as a touch panel or ten-key pad from which information such as a control instruction is entered by the operation of the user and a display portion 102b such as a liquid crystal panel which displays information necessary for operation. Authentication codes which authenticate the user or operator of the present digital multi-function peripheral are entered into the operation portion 102. In some cases, the authentication codes may be entered from an external device via the FAX modem 108 or communication portion 105. An example of the authentication processing using authentication codes will be described herebelow in more detail.

A hard drive (HD) 106 is connected to the machine control portion 104. The hard drive 106 stores image data which is related with image processing of the image data which is generated by the image reading portion 101, and the like. An erasing portion 109 is also connected to the machine control portion 104. The erasing portion 109 is adapted to erase data recorded and held on the hard drive 106 under control of the machine control portion 104.

An image processing portion 110 which achieves a processing to append specific image information of the present invention is also connected to the machine control portion 104. The specific image information is used to prohibit copying or discourage the user from copying by notifying the user that copying is prohibited.

The image processing portion 110 has a specific image information appending portion 110b for appending the image data with the specific image information. The specific image information appending portion 110b preliminarily holds the specific image information to be appended to the image data (or makes another accessible memory hold it) and appends the image data with the specific image information under control related with the appending of the specific image information by the machine control portion 104 and makes the memory 103a hold it. The image data which has been processed in the image processing portion 110 is converted into print data which is ultimately output at the printing portion 103b.

The image processing apparatus of the present embodiment which is thus configured appends, according to the predetermined specific image information appending conditions, the image data which meets the appending conditions with the specific image information in a form which is set in accordance with the appending conditions when image formation of the image data which is read at the image reading portion 101 or the image data which is externally entered via the FAX modem 108 or communication portion 105 is used for image formation at the printing portion 103b.

In the embodiment of the present invention, the specific image information is usually appended if higher secrecy processing referred to as "confidential processing" is conducted when the image processing apparatus outputs the image data to make the image forming apparatus (printer) conduct the image formation. The conditions of appending of the specific image information are set and held, for example, in a memory of the image processing portion 110 or a memory which is accessible by the image processing portion 110. In other words, the function of the specific image information appending condition setting portion is achieved by the image processing portion 110. Definition of the confidential processing, setting of the appending conditions of the specific image information and an example of setting the appending format of the specific image information depending upon the appending conditions will be described herebelow.

The image processing portion 110 comprises an appended information detecting portion 110a which detects whether or not image data which is read by the image reading portion 101 and saved in the memory 103a includes the specific image information. If a result of detection made by the appended information detecting portion 110a shows that the image data includes the specific image information, the machine control portion 104 performs a control to prohibit copying of the image data (image forming in the image forming portion 103 is disabled).

Figure 2:
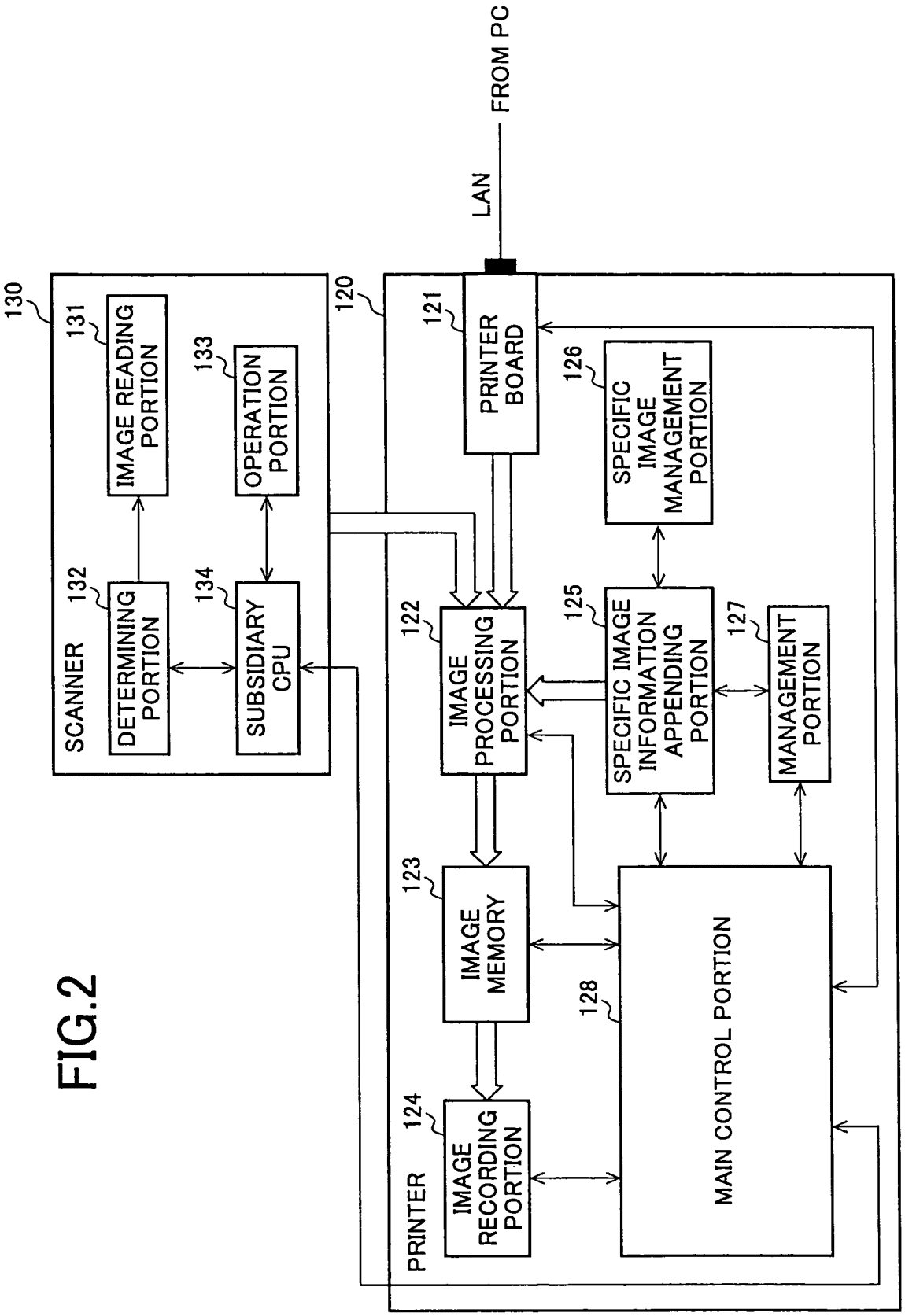
FIG. 2 is a block diagram for explaining an exemplary configuration of an image forming apparatus to which an image processing apparatus is applicable.

FIG. 2 is a block diagram for explaining an exemplary configuration of the image forming apparatus to which the image processing apparatus of the present invention is applicable. In this example, a scanner 130 includes a determining portion 132 for determining whether or not the specific image information is contained in the image data when recording material on which the specific image data is recorded is read by the scanner.

In this example, the scanner 130 comprises an image reading portion 131 which reads images recorded on recording paper and the like, a determining portion 132 for determining whether or not the specific image information is contained in the image data which is read by the image reading portion 131, an operation portion 133 which accepts the operation input by the user or the input of authentication codes and the like, and a subsidiary CPU 134 for controlling each component of the scanner 130.

A printer board 121 of a printer 120 conducts communication with an external device such as PC via the network such as LAN. An image processing portion 122 applies image processing to the image data input from an external device via the printer board 121 or image data read by the scanner 130, and makes an image memory 123 hold it. Here, the image processing portion 122 evolution-processes the input image data and makes the image memory store and hold it as printing executing data. In the image processing portion 122, the image data is appended with specific image information appended by a specific image information appending portion 125 to generate print executing data. An image recording portion 124 conducts image formation on recording paper and the like with using the print executing data stored and held in the image memory 123.

A specific image management portion 126 manages specific image information which will be appended to the image data. Here, the specific image management portion 126 is provided with a storage portion which stores specific image information in predetermined forms. The specific image information appending portion 125 instructs the image processing portion 122 to append the image data to be used for the image formation at the image recording portion 124 with specific image information in a given form in accordance with predetermined specific image information appending conditions. The management portion 127 is a memory, which stores management information (various items of control information) used for managing processing which is conducted by the printer 120. A main control portion 128 controls operation of each of the above components.

The printer 120 shown in FIG. 2 may be a multi-function peripheral including the scanner 130 or alternatively a peripheral which is connected to a separate scanner 130 so that data can be transferred between them.

When the printer 120 having the afore-mentioned structure conducts, at the image recording portion 124, image formation to image data read by the scanner 130 or image data input from an external device via the printer board 121, the printer 120 appends specific image information to the image data which meets the predetermined conditions of appending of specific image information in accordance with the specific image information appending conditions. Here, if confidential processing is conducted in accordance with the specific image appending conditions, the image data will be appended with the specific image information. The specific image information which is to be appended to the image data is managed by the specific image management portion 126, transferred to the image processing portion 122 by the specific image information appending portion 125, and appended to object image data at the image processing portion 122 as mentioned above.

If the determining portion of the scanner 130 determines that specific image information is included in the image data read by the image reading portion 131, the subsidiary CPU 134 of the scanner 130 transmits this determination result to the main control portion 128 of the printer 120. The main control portion 128 conducts a control to prohibit copying of the image data (or, to prohibit image formation at the image recording portion 124) in accordance with the transmitted determination result.

Figure 3:
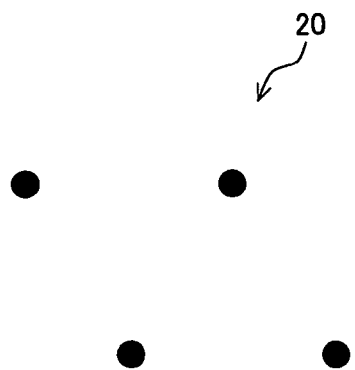
FIG. 3 is a view showing an example of specific image information which is applicable to the present invention.

FIG. 3 is a view showing exemplary specific image information which is applicable to the present invention. In the drawing, a reference numeral 20 denotes specific image information. The specific image information 20 may be formed as a pattern comprising a plurality of dots which are arranged as shown in FIG. 3. By detecting the specific image information 20 by a copy machine, in the copy machine, copying per se is prohibited, or alert information which alerts the user that copying is prohibited or restricted is appended to image information and copied images are output. The copy machine can be configured so that words "Copy Prohibited" are printed as the alert information or a word "Sample" is printed as the alert information for the copy prohibited image, for example, a bank note. In the present embodiment, the specific image information 20 is visual to eyes of human beings when image formation thereof is conducted.

Figure 4:
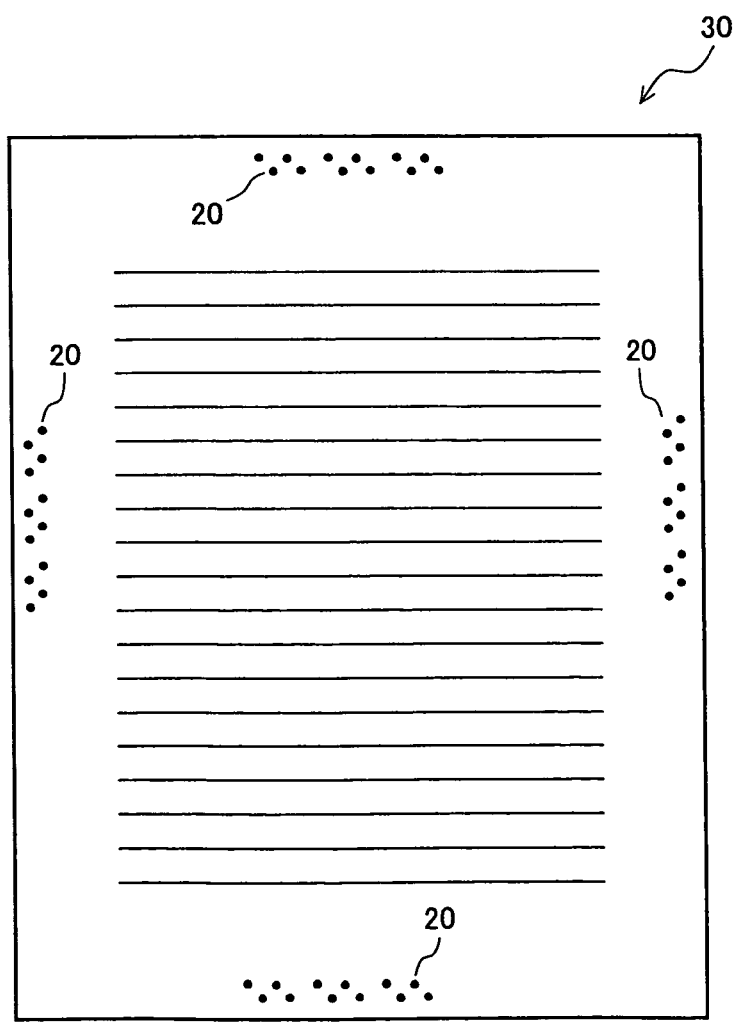
FIG. 4 is a view showing an exemplary arrangement of the specific image information on recording paper.

FIG. 4 is a view showing exemplary arrangement of the specific image information on recording paper. The specific image information 20 is printed out in the vicinity and in the inner side of each of four corners of recording paper 30 by using the specific image information 20 which is shaped as shown in FIG. 3. When a document bearing such specific image information 20 thereon is tried to be copied, the copy machine recognizes the printed specific image information 20 to conduct processing for copy prohibition. The shape and arrangement of the specific image information 20 is not limited to the illustrated shape and arrangement and may be appropriately modified.

The image processing apparatus appends the image data with specified specific image information having a given form in accordance with predetermined specific image information appending conditions. The specific image information appending conditions allow the appending form of the specific image information to be individually set depending upon the characteristics of image data (items of appending conditions).

FIG. 5 is a flow chart for explaining an example of processing for setting conditions for appending the specific image information in an image processing apparatus. It is assumed that the authority of setting the conditions of appending the specific image information to the image data is provided to only, for example, administrators of the image processing apparatus. When the appending conditions are set to the image processing apparatus, the image processing apparatus initially requests the authentication of the administrator (step S1). In this case, for example, when a request of setting of the appending conditions is input to the operation portion 102 of the digital multi-function peripheral 10 of FIG. 1, the machine control portion 104 of the image processing apparatus displays an entry request to input administrator information (administrator authentication code) on the display portion 102b.

If administrator information is entered in response to the display (step S2), the image processing apparatus determines whether or not the authentication of the manger information is OK (step S3). If the authentication is NG (no good), the administrator information is requested again (step S6), and the sequence will return to step S2. If the authentication is OK at step S3, the appending conditions are set by the operation of the administrator (step S4). If setting of appending conditions is completed at next step S5, processing for setting appending conditions is ended.

FIG. 6 is a view for explaining an example of setting of the specific image information appending conditions. An example of display screen which is displayed by the image processing apparatus on setting of the appending conditions is illustrated. In the example shown in FIG. 6, items for setting appending conditions of specific image information include "IP address A", "IP address B", "Copy", "FAX", "Printer", "Security print", "Hold print", "Presence of document filing password" and "Absence of document filing password" which are preliminarily set. Higher and lower "levels" can be set for respective items. A word "level" basically means the secrecy level of the image data. Forms of the specific image information can be individually set depending upon the secrecy level.

The reason why two items of "IP address" are defined, selection between two secrecy levels may be made depending upon, for example, the user of a computer which is connected to the Internet or intranet. For example, managers in a corporate may set the level higher with "IP address A" while other workers may set the level medium with "IP address B". Alternatively, levels may be set depending upon user authentication information which is entered by other users.

Different levels may be selected for the other items "Copy", "FAX" and "Printer" depending upon respective apparatus or unit when image data is entered via these apparatus or units.

Items "Security print" and "Hold print" are for setting the level for specific print output with higher secrecy. Some printing apparatuses (printers) such as copy machines have a printing out function referred to as "security print" or "hold print"

which consider secrecy. Higher secrecy print including security print and hold print is defined as "confidential print". Image processing for the confidential print is defined as "confidential processing".

In "security print", when the image data is transferred to the printer from the PC for conducting printing, a signal representing this selection and a password for the print are transferred to the printer from PC, and the print data is transferred to the printer, and the signal, password and the print data are stored in a memory of the printer. The user recognizes the password on the display of the PC and goes to the printer to enter its password. Then, the printer starts to print-out. In some memory environment on the printer side, the print data may be held on the PC side and may be transferred to the printer from the PC for printing-out after the password is input to the printer.

The "Security print" is inherently adapted to conduct higher secrecy printing-out. In the present embodiment, the level is usually set higher for it. In this case, the level of "Security print" can be optionally set by the administrator.

The "Hold print" is applied when some level of secrecy is required although document management using a password like the above-mentioned security print is not conducted. In this case, the image data which is transferred from PC and the like is not printed out directly, but is stored in the printer. If the user goes to the printer to input an instruction for outputting desired print data from the printer, its print data is then printed. An intermediate level is set for "Hold print", but the level can be optionally set for it.

The "Document filing" is a function to store image data which is read by the image reading portion (scanner) or image data transmitted from an external device such as PC in, for example, a memory of a printer (HDD and the like). The stored image data may be used for image formation, may be transmitted to an external device which is specified by an operation input to the operation portion or may be transmitted in response to a transmission request from an external device such as PC.

Both a filing function having a higher secrecy in which a password is set and a filing function in which no password is set can be set for the above-mentioned document filing function. Different levels may be set for respective filing functions. In the present embodiment, the level is set higher if a password is set for the document filing.

Figures 7, 8:
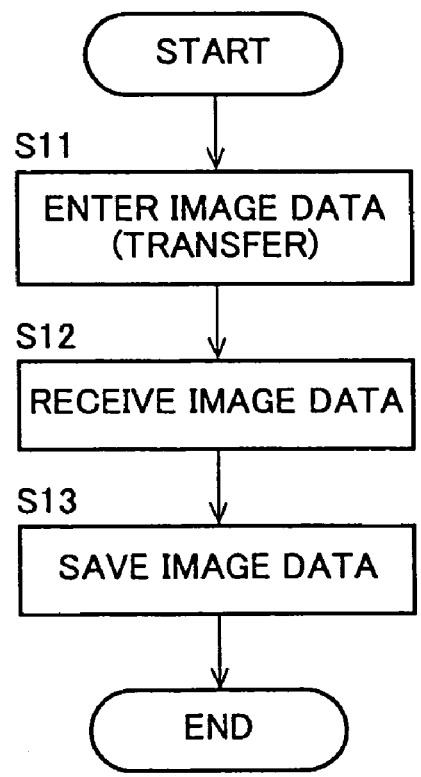
FIG. 7 is a view showing an example of table which defines forms of appending the specific image information to be appended to image data with respect to set values of specific image information appending conditions which are set in FIG. 6.
FIG. 8 is a flow chart for explaining an example of processing for saving image data in a confidential print function.

FIG. 7 is a view showing an example of a table which defines forms for appending the image data with specific image information with respect to values of specific image data information appending conditions which are set in FIG. 6. As shown in FIG. 7, forms for appending the image data with specific image information are set depending upon the levels of appending conditions.

The specified level denotes a level which is set so that it corresponds to each of setting items of appending conditions shown in FIG. 6 and is classified into higher and lower levels. For example, if the level is high, 5 items of specific image information are appended to the image data in the center thereof (the center of the recording material if the image is recorded thereto) and these specific image information is deeply printed. If the level is low, one item of specific image information is appended to the image data at the edge thereof (the edge of the recording material if it is recorded thereon) and the specific image information is lightly printed.

In this case, the appending form of the specific image information is set in accordance with the degree of the detection accuracy at the time of detecting the specific image information. For example, if the secrecy level of the image data is higher, it is necessary to positively detect the specific image information in a copy machine when copying a recording material to which the specific image information is appended. Accordingly, if the secrecy level is higher, it is set to deeply print more number of items of the specific image information on recording paper at the center part thereof rather than the edge parts thereof.

It is possible to set the items of the conditions for appending specific image information and the secrecy level for each of the condition setting items. When image formation of the image data is actually conducted, the formed image may be appended with the specific image information depending upon the level of the image data in accordance with predetermined appending form of the specific image information.

It is to be noted that, with respect to the appending conditions of the specific image information, it is not limited to those in the example in FIG. 6, and it is possible to optionally set the items of the conditions for appending the specific image information. Further, setting of the appending form of the specific image information is not limited to two levels such as high and low levels as FIG. 7, but may be made for multi-levels. For example, it may be set to append the specific image information in a given form to the image data for the higher level, and to append no specific image information for the lower level.

In the present embodiment, it is set so that the specific image information is usually appended for image processing having a higher secrecy level, such as confidential print including security print or hold print and document filing to which a password is provided.

With respect to the appending conditions of the specific image information, the appending form of the specific image information may be uniquely determined for each condition setting item without setting the level for the condition setting item.

The image processing apparatus may allow switching between enabling/disabling of the appending processing of the specific image information when a specific operator such as administrator is recognized with an authentication code. In other words, the image processing apparatus may be configured so that an operator having administrator privilege may optionally turn on/off the appending function of the specific image information which functions in accordance with the above-mentioned appending conditions.

Figure 9:
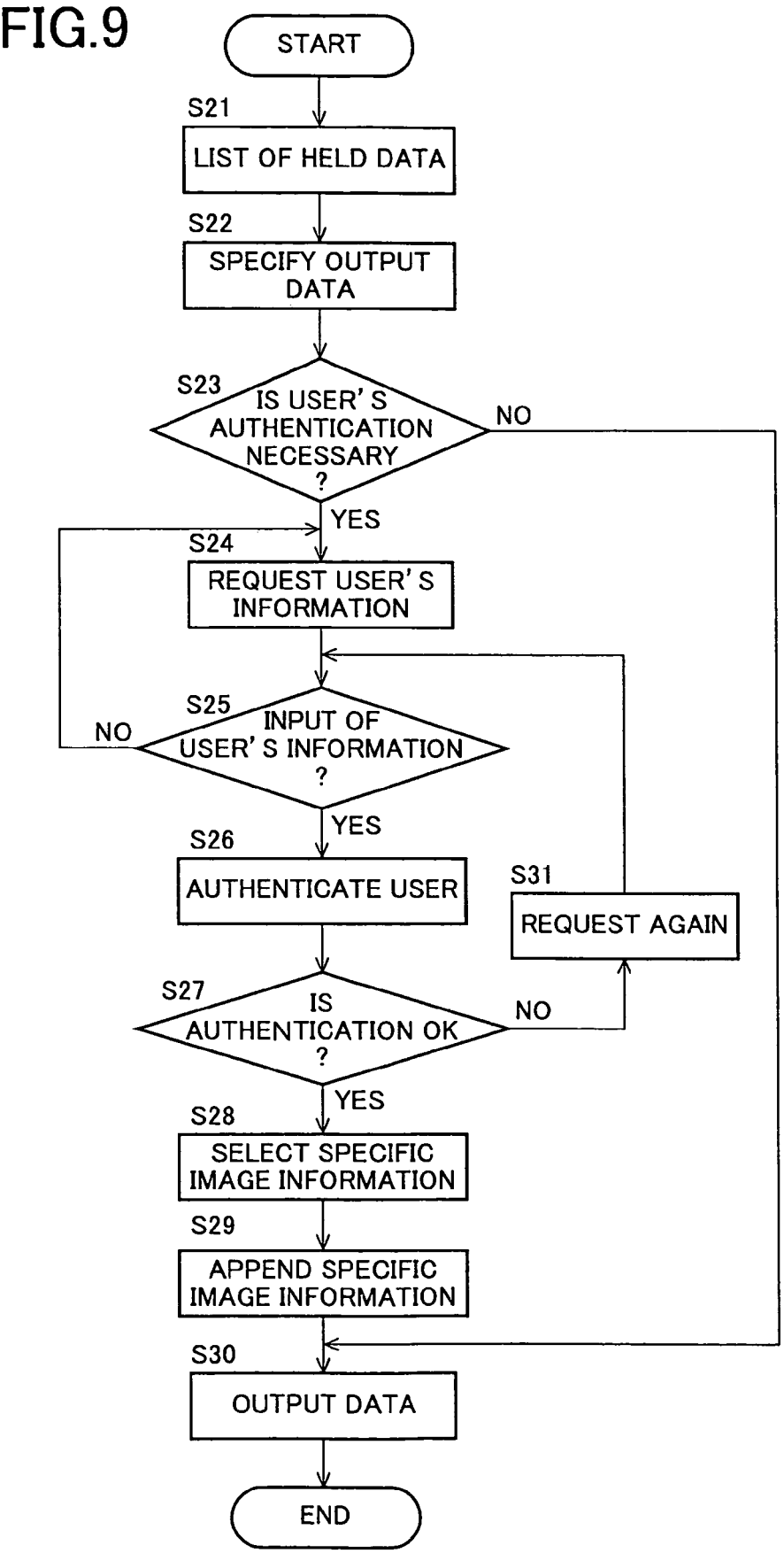
FIG. 9 is a flow chart for explaining an example of processing for outputting image data in the confidential print function.

FIG. 8 is a flow chart for explaining an example of processing for saving image data in a confidential print function. FIG. 9 is a flow chart for explaining an example of processing for outputting image data in the confidential print function.

In FIG. 8, when image data for confidential print is input (transferred) to the image processing apparatus of the present invention which serves as a printer (step S11), the image processing apparatus receives the image data (step S12) to save the image data in a given storing portion such as HDD (step S13).

In FIG. 9, if saved image data is printed, a list of held data (image data which are saved in the image processing apparatus) is then displayed (step S21). Display of the list of held data may be conducted in response to a user's operation. Alternatively, the list may be always displayed if the image data for print is saved in the image processing apparatus.

Subsequently, output data which is used for image formation is specified from the list of the held data (step S22). The output data can be specified in response to user's select operation for the held data displayed in the list. Then, a determination is made whether or not user's authentication is necessary to print (step S23). The print which requires the authentication of the print user is the above-mentioned security print whereas the print which does not require the authentication is the above-mentioned hold print.

If it is determined that the print does not require user's authentication at step S23, the specified output data is output as is (step S30) and processing is ended. If it is determined that the print requires user's authentication, user's information is then requested (step S24). In this case, a request to input user's information is displayed on the display portion of the image processing apparatus (for example, display portion 102b of FIG. 1).

A user inputs user's information (user's authentication code) in accordance with the input request of user's information which is displayed on the image processing apparatus. The image processing apparatus determines whether the user's information is input (step S25). If the user's information is input, authentication of the input user's information is conducted (step S26). A determination is made whether or not the authentication is OK (step S27). If the authentication is not OK, input of user's information is requested again (step S31) and the sequence will return to step S25 for waiting for input of user's information.

If it is determined that user's authentication is OK at step S27, specific image information is selected (step S28). The selected specific image information is appended to image data (step S29) for conducting data output (step S30).

Figure 10:
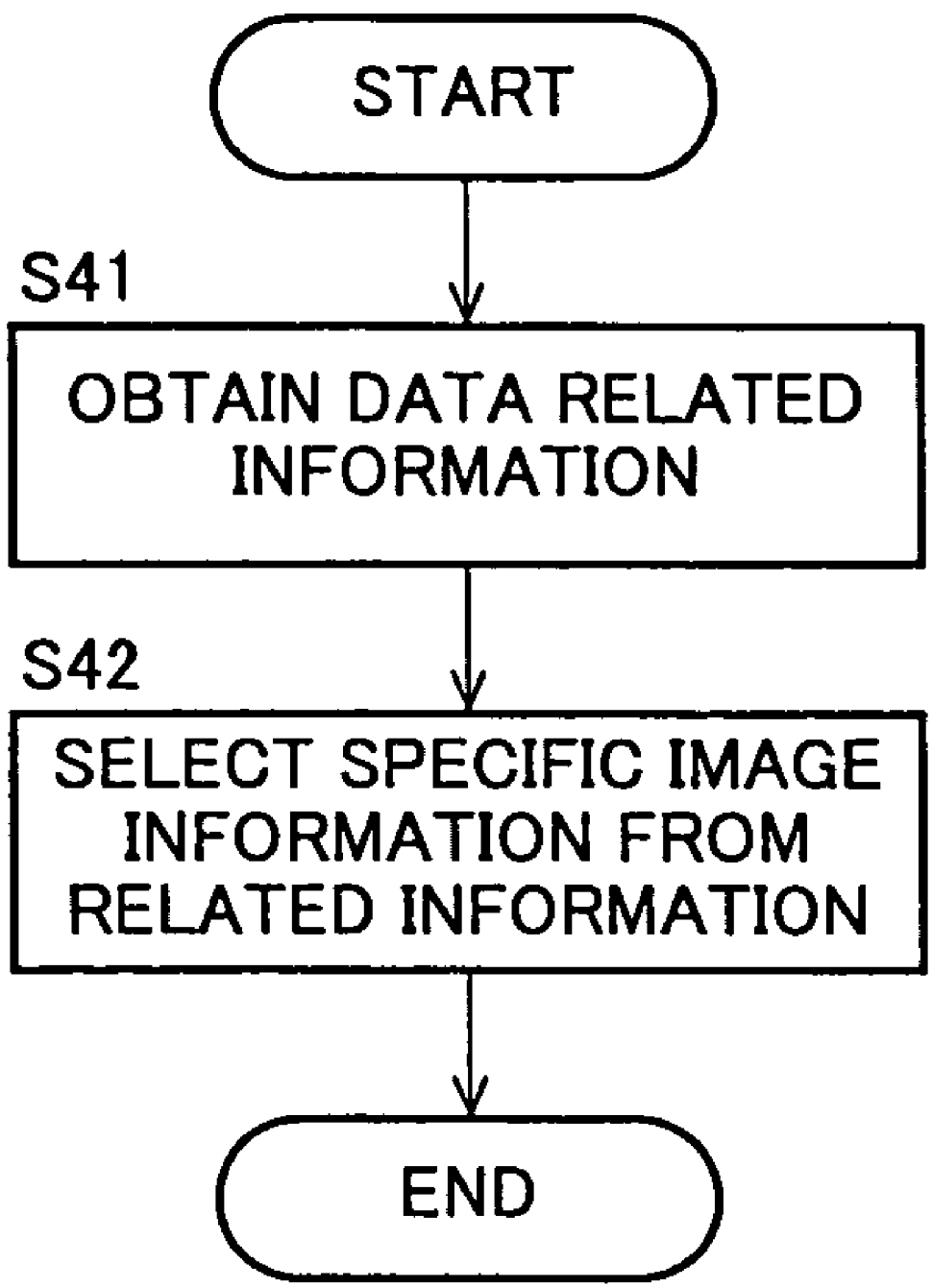
FIG. 10 is a flow chart for explaining an example of processing when specific image information which is prepared at the image processing apparatus is selected.

FIG. 10 is a flow chart for explaining an example of processing when specific image information which is prepared at the image processing apparatus is selected. An example of processing at step S28 in FIG. 9 is illustrated. Initially the image processing apparatus obtains data related information (step S41). The data related information is related information which is used for selecting specific image information which is to be appended to image data from specific image information held in the image processing apparatus. For example, specific data related information is specified in accordance with a result of level determination shown in FIG. 5. Specific image information is then selected from the obtained data related information (step S42). The selected specific image information is appended to the image data.

The present invention provides advantages as follows:

In accordance with the present invention, there is provided an image processing apparatus having a high convenience in which specific image information used for prohibiting or discouraging copy of image information is appended depending upon the characteristics of image data to which image processing is applied and conditions for appending specific image information may be optionally set.

In accordance with the present invention, if an image processing apparatus conducts high secrecy confidential processing when image formation is conducted by outputting image data, the image data to be output is appended with specific image information. Thus, it is possible to append specific image information depending upon the secrecy of the object image data.

These functions enable appending of optimal specific image information when the secrecy of object image data is high. Copy prohibition function can be effectively enabled and the visibility of the formed image is not lost as much as possible in case of usual image processing.

The invention claimed is:

1. An image processing apparatus for applying confidential processing to input image data, comprising:
a machine control portion; and
an image processing portion operably connected to the machine control portion, the image processing portion including at least a memory for storing conditions of appending specific image information, the conditions of appending specific image information for setting the specific image information applicable to the input image data being varied based on a source of the input image data, and a specific image information appending portion for appending the specific image information to the image data under control of the machine control portion;
wherein the specific image information appending portion appends the image data with the specific image information representing a specific image when the conditions of appending the specific image information are satisfied such that said image data is processed with said confidential processing.

2. An image processing apparatus as defined in claim 1, wherein said image processing apparatus is an image forming apparatus forming an image on a recording material in accordance with input image data.

3. An image processing apparatus as defined in claim 2, wherein, when said image formation is conducted using input image data, if it is confirmed that image data used for said image formation is an image to be confidentially processed by said confidential processing information, said image processing apparatus stores and holds said input image data in a given storing portion, and conducts image formation using image data stored and held in said storing portion when a given image formation output operation is performed.

4. An image processing apparatus as defined in claim 1, wherein said image processing apparatus comprises a specific image appending condition setting portion for setting a condition for appending said specific image information that is to be appended at said specific image information appending portion; a storing portion for storing input image data; and an output instruction portion which accepts an instruction to output said image data stored in said storing portion, wherein, when an instruction to output image data stored in said storing portion is issued to said output instruction portion, if it is necessary to append specific image information to the image data instructed to be output in accordance with the appending condition of said specific image information which is set by said specific image appending condition setting portion, said image processing apparatus appends said image data with said specific image information for outputting it.

5. An image processing apparatus as defined in any one of claims 1 through 4, wherein said specific image information is visual to an eye of human being when image formation thereof is conducted.

6. An image processing apparatus as defined in any one of claims 1 through 4, wherein said image processing apparatus comprises an image reading portion for reading an image output as a document, and when it determines that said specific image information is included in image information which is read by said image reading portion, said image processing apparatus invalidates said read image information.

7. An image processing apparatus as defined in claim 5, wherein said image processing apparatus comprises an image reading portion for reading an image output as a document, and when it determines that said specific image information is included in image information which is read by said image reading portion, said image processing apparatus invalidates said read image information.

* * * * *